US012802028B2

(12) United States Patent
Sanchez et al.

(10) Patent No.: US 12,802,028 B2
(45) Date of Patent: Nov. 17, 2026

(54) PREDICTIVE PICKING OF ITEMS FOR STAGING IN A RAPID FULFILLMENT AREA IN ASSOCIATION WITH AN ONLINE CONCIERGE SYSTEM

(71) Applicant: Maplebear Inc., San Francisco, CA (US)

(72) Inventors: Kenneth Jason Sanchez, Orange, CA (US); Haochen Luo, Conroe, TX (US); Eric Hermann, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 745 days.

(21) Appl. No.: 18/113,866

(22) Filed: Feb. 24, 2023

(65) Prior Publication Data

US 2024/0289738 A1 Aug. 29, 2024

(51) Int. Cl.

*G06Q 10/087* (2023.01)
*G06Q 10/04* (2023.01)
*G06Q 10/083* (2024.01)

(52) U.S. Cl.

CPC ........... *G06Q 10/087* (2013.01); *G06Q 10/04* (2013.01); *G06Q 10/083* (2013.01)

(58) Field of Classification Search

CPC ..... G06Q 10/087; G06Q 10/04; G06Q 10/083
See application file for complete search history.

(56) References Cited

U.S. PATENT DOCUMENTS

| | | | | |
|---|---|---|---|---|
| 2014/0172621 | A1 | 6/2014 | Vittolia | |
| 2017/0083862 | A1* | 3/2017 | Loubriel | G06Q 10/0835 |
| 2018/0247257 | A1* | 8/2018 | Lert, Jr. | G06Q 10/087 |
| 2020/0219171 | A1* | 7/2020 | Zhuang | G06Q 10/087 |

(Continued)

FOREIGN PATENT DOCUMENTS

| | | | | |
|---|---|---|---|---|
| CN | 113361739 | A | 9/2021 | |
| WO | WO-2022115679 | A1 * | 6/2022 | G06Q 10/063 |

OTHER PUBLICATIONS

PCT International Search Report and Written Opinion, PCT Application No. PCT/US2023/83699, Apr. 4, 2024, 10 pages.

(Continued)

*Primary Examiner* — Michael Jared Walker
*Assistant Examiner* — Jessica E Sullivan
(74) *Attorney, Agent, or Firm* — Fenwick & West LLP

(57) ABSTRACT

An online concierge system facilitates ordering of items by customers, procurement of the items from physical retailers by pickers assigned to the orders, and delivery of the orders to customers. To enable efficient procurement, the online concierge system may facilitate preemptive picking of items for staging at a rapid fulfillment area of the physical retailer, and pickers may selectively pick items from the rapid fulfillment area instead of their standard storage locations. Decisions on which items to preemptively pick may be based on a predictive optimization model that scores and ranks items for predictive picking in accordance with various optimization criteria. In the course of fulfilling orders, pickers may furthermore be assigned to replenish items from the standard storage locations to the rapid fulfillment area to satisfy future predicted or actual orders in a manner that optimizes a cost metric.

17 Claims, 4 Drawing Sheets

(56) References Cited

U.S. PATENT DOCUMENTS

| | | | | |
|---|---|---|---|---|
| 2022/0092497 | A1* | 3/2022 | Roth | G06Q 10/06313 |
| 2022/0114640 | A1 | 4/2022 | Pawar | |
| 2022/0292580 | A1* | 9/2022 | Putrevu | G06Q 10/087 |
| 2023/0049669 | A1* | 2/2023 | Yuan | G06Q 30/0201 |
| 2024/0029145 | A1 | 1/2024 | Lert, Jr. | |
| 2024/0161060 | A1* | 5/2024 | Francis | G06Q 10/087 |

OTHER PUBLICATIONS

Final Rejection Mailed on Sep. 11, 2025 for U.S. Appl. No. 18/113,868, 10 page(s).

United States Office Action, U.S. Appl. No. 18/113,868, filed Jan. 6, 2026, ten pages.

United States Office Action, U.S. Appl. No. 18/113,868, filed Mar. 10, 2025, 19 pages.

* cited by examiner

PREDICTIVE PICKING OF ITEMS FOR STAGING IN A RAPID FULFILLMENT AREA IN ASSOCIATION WITH AN ONLINE CONCIERGE SYSTEM

BACKGROUND

This disclosure relates generally to an online concierge system for managing procurement and delivery of items to customers and more specifically to computer hardware and software for predictive picking and dynamic replenishment of items for rapid fulfillment.

In an online concierge system, customers may select items for ordering, procurement, and delivery from physical retailers or other warehouses. A significant component of the delay between a customer placing and receiving an order can arise from the time it takes for a picker to retrieve ordered items from a retail shelf or other storage location. Reducing the time to obtain items after an order is placed can result in significantly faster deliveries, which can improve customer satisfaction and profitability.

Designing and implementing a computer system to achieve these goals, however, is particularly challenging, especially when attempting to optimize consumption of computing resources such as processing power and network bandwidth. For example, such a system may need to consider multiple factors, such as the delivery location, the availability of the items at the nearest physical retailer or warehouse, the capacity and availability of delivery vehicles, traffic conditions, and delivery time windows specified by the customer. The system may further need to optimize these factors, possibly in real-time, to create efficient delivery routes that minimize the time and distance traveled by delivery vehicles. This optimization could also involve integrating with various data sources, such as GPS and traffic data, to accurately estimate travel times and adjust delivery schedules, as well as monitoring inventory levels at physical retailers or warehouses to ensure that items are available for procurement and delivery. Overall, optimizing delivery routes and schedules while continuously monitoring inventory levels presents a technical challenge in implementing an online concierge system for managing procurement and delivery of items to customers.

SUMMARY

In accordance with one or more embodiments, an online concierge system facilitates predictive picking of items for staging in a rapid fulfillment area to improve operational efficiency. The online concierge system obtains a store plan indicating standard storage locations of items in a physical retailer and information about a rapid fulfillment area of the physical retailer available to stage select items for rapid fulfillment. The online concierge system also obtains upcoming order information associated with actual or predicted orders for items in an upcoming time window. The online concierge system applies an optimization model to determine, based on the store plan and the one or more actual or predicted orders, one or more items for staging in the rapid fulfillment area during the upcoming time window. The online concierge system facilitates, via a picker client device, picking of the items from the standard storage locations to the rapid fulfillment area. The online concierge system receives an order from a customer that includes at least one item stocked to the rapid fulfillment area. The online concierge system directs the picker to procure the order from the physical retailer. Here, procurement may include procuring the at least one item from the rapid fulfillment area. The online concierge system then facilitates delivery of the order to the customer.

In one or more embodiments, applying the optimization model comprises determining, for each of a set candidate items, respective cost metrics characterizing incremental costs associated with the picker picking the candidate items from their respective standard storage locations instead of the rapid fulfillment area, generating a ranking of the set of candidate items based on the respective cost metrics, and selecting a subset of the candidate items for stocking in the rapid fulfillment area based on the ranking.

In one or more embodiments, determining the respective cost metrics comprises determining, for each of the set candidate items, respective time differences between a picker procuring the candidate items from their respective standard storage locations and the picker procuring the candidate items from the rapid fulfillment area, and determining the respective cost metrics based at least in part on the respective time differences.

In one or more embodiments, determining the respective time differences comprises predicting paths of pickers for fulfilling orders, and determining the respective time differences based at least in part on the predicted paths.

In one or more embodiments, determining the respective cost metrics comprises determining size information for each of the set candidate items, and determining the respective cost metrics based at least in part on the size information relative to available space in the rapid fulfillment area.

In one or more embodiments, obtaining the upcoming order information comprises applying a predictive model to historical data indicative of historical orders in the online concierge system. For example, obtaining the upcoming order information may comprise determining respective likelihoods associated with the items being ordered within the upcoming time window. In another embodiment, obtaining the upcoming order information comprises determining for each of the items, respective predicted amounts of time until the items will be picked.

In another embodiment, a method facilitates dynamic replenishment of items staged to a rapid fulfillment area of a physical retailer. The online concierge system obtains a store plan indicating standard storage locations of items in a physical retailer and information about a rapid fulfillment area of the physical retailer available to stage select items for rapid fulfillment. The online concierge system obtains order information associated with an order for items in an upcoming time window, in which the order is assigned to a picker to procure the items for a customer from the physical retailer. The online concierge system applies an optimization model to determine, based on the store plan and the order information, one or more assignments for the picker to pick a replenishment item from its standard storage location and deliver the replenishment item to the rapid fulfillment area in association with fulfilling the order. The online concierge system provides, to a picker client device, information to facilitate picking by the picker of the items in the order including at least one item for picking from the rapid fulfillment area, and information to facilitate picking by the picker of the replenishment item from the standard storage location for delivery to the rapid fulfillment area. The online concierge system facilitates, via the picker client device, delivery of the order to the customer.

In one or more embodiments, the replenishment item comprises a different item category than the items in the order.

In one or more embodiments, applying the optimization model comprises determining a first cost metric associated with the picker picking a candidate item from the rapid fulfillment area, determining a second cost metric associated with the picker picking the replenishment item from the standard storage location. The online concierge system furthermore determines a combined cost metric derived from the first cost metric and the second cost metric, in which the combined cost metric represents a net gain or loss relative picking only the items in the order from their respective standard storage locations. The online concierge system determines the assignments based on the combined cost metric.

In one or more embodiments, determining the assignments comprises presenting, via the picker client device, an indication of the combined cost metric, enabling user selection of an option for the picker to procure the replenishment item in exchange for enabling picking of the at least one item from the rapid fulfillment area, and determining the assignments in response to the user selection.

In one or more embodiments, applying the optimization model comprises performing one or more simulations of picker activity while varying replenishment assignments, and determining the assignments based on results of the one or more simulations.

In one or more embodiments, applying the optimization model comprises modeling a predicted path of the picker through the physical retailer while fulfilling the order, and determining the assignments based at least in part on the predicted path.

In one or more embodiments, providing the information to facilitate the picking comprises providing, based on the items in the order, the replenishment item, and the store plan, navigational guidance for picking the items in accordance with a determined path through the physical retailer.

In another aspect, a non-transitory computer-readable storage medium stores instructions executable by one or more processors for performing any of the methods described above. In yet another aspect, a computer system includes one or more processors and a non-transitory computer-readable storage medium that stores instructions executable by the one or more processors for performing any of the methods described above.

DETAILED DESCRIPTION

Figure 1:
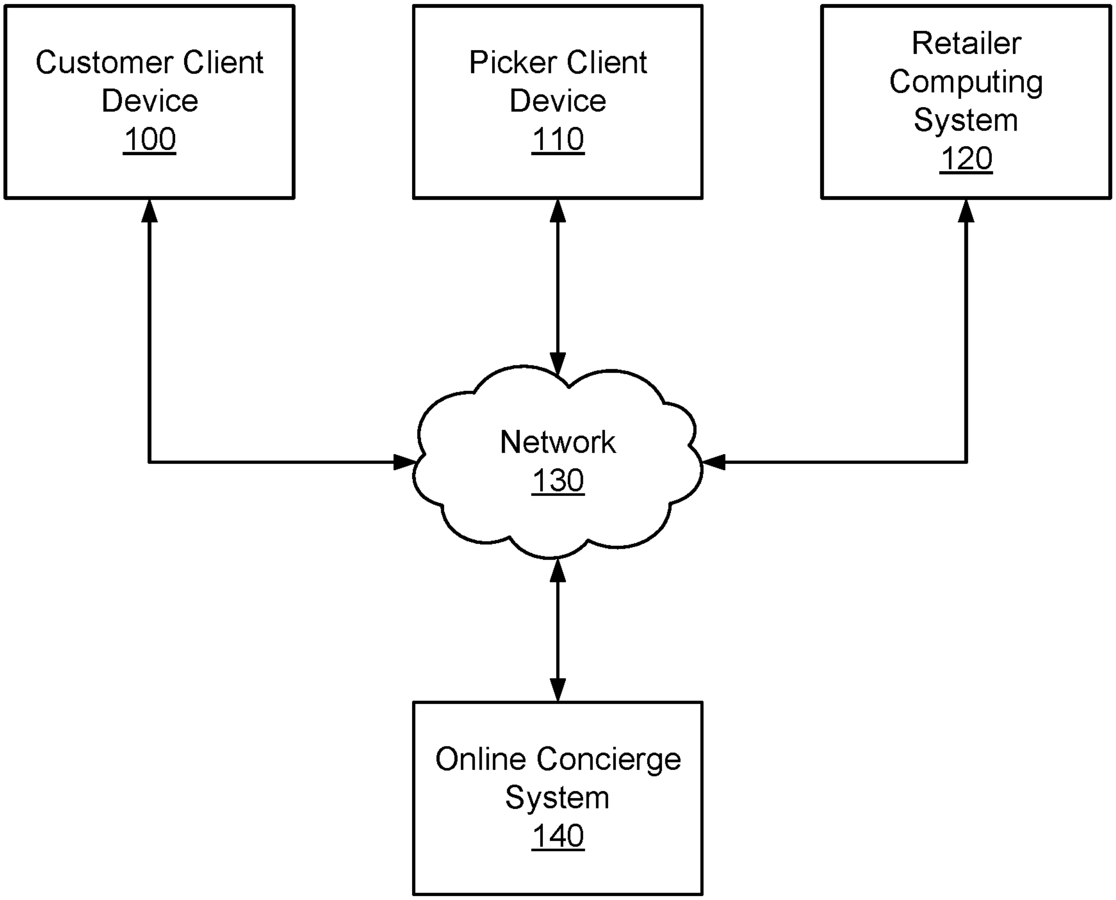
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered.

Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

As will be further described below, to facilitate rapid fulfillment of orders, a retailer may reserve a relatively small space (e.g., 20%, 10%, 5% or less of the overall space available in the warehouse) for holding items predicted to be picked during an upcoming time window. The location may be near a checkout area of the retailer, or other location close to an entrance and/or exit of the retail location. When correct predictions are made, a picker can pick the item from the rapid fulfillment area, which may save significant time relative to picking the item from its conventional storage location. When items are available for picking from the rapid fulfillment area, the picker client device 110 may alert the picker that certain items in an order are available at this location and direct the picker to pick the items accordingly when fulfilling the areas. Techniques for optimizing which items should be stocked in the rapid fulfillment area and techniques for efficiently replenishing the items in the rapid fulfillment area are described in further detail below.

Figure 2:
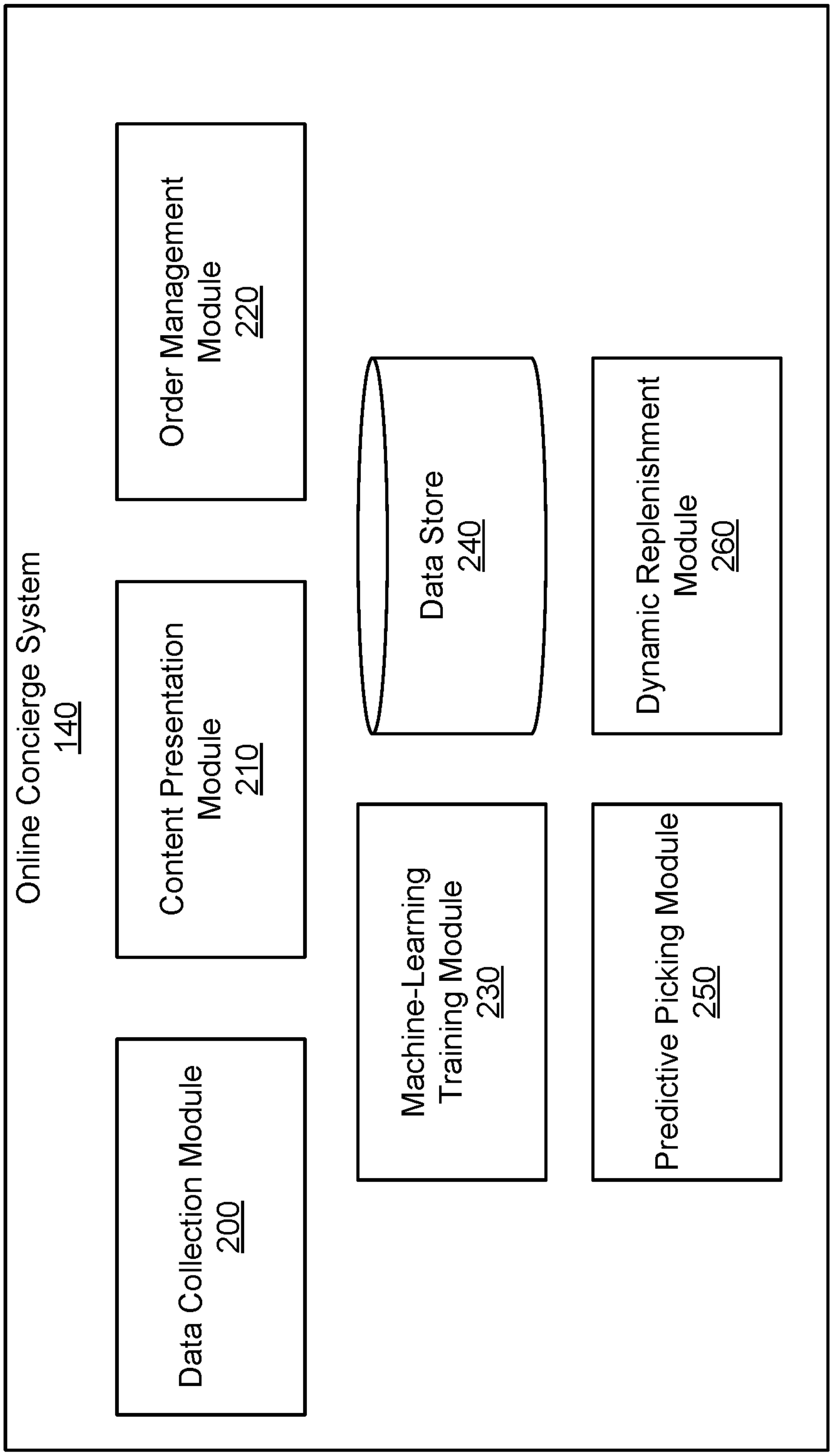
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, a predictive picking module 250, and a dynamic replenishment module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order, or to an offsite staging area where items have been preemptively picked. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location or other staging area. When the picker arrives, the order management module 220 transmits the order to the picker client device 110 for display to the picker. As the picker uses the picker client device 110 to collect items at the retailer location or other staging location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected.

Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The predictive picking module 250 facilitates predictive picking of items for stocking in a rapid fulfillment area. The predictive picking module 250 may apply an optimization model that determines which items to preemptively stock in the rapid fulfillment area according to a cost metric. The cost metric characterizes an incremental cost (in dollars, time, other metric, or a combination thereof) associated with a picker retrieving the item from a standard storage location instead of the rapid fulfillment area, or conversely may characterize a relative expected value of having the item available in the rapid fulfillment area instead of its normal storage location.

The cost metric may be based on various factors. For example, the cost metric may be based in part on inferred likelihoods and confidence levels of each item being ordered in an upcoming time window. These likelihoods and confidence levels may be derived from a machine learning model trained on historical data to predict orders for upcoming time windows. For example, the model may employ time-series modeling techniques, supervised learning techniques, or a combination thereof. The predictive model may be trained on a per-customer basis (e.g., by learning that a customer orders bananas every Tuesday) and/or on population basis (e.g., learning which items are most popular within a community). In one or more embodiments, the predictive picking module 250 may determine a likelihood distribution on a per-item basis of the item being included in an order in an upcoming time window.

In cases where at least one actual order has been received for an upcoming time window, the cost metric may instead be based on the actual items ordered instead of inferred likelihoods. In this case, the likelihood associated with the ordered items may be 100% or near 100%. Generally, the expected value of having the item in the rapid fulfillment area may increase with increased likelihood and/or confidence of the item being ordered in the upcoming time window.

In another embodiment, the predictive picking module 250 may estimate, for each item, a time until the item is expected to be picked according to actual or predicted future orders. For example, items that are expected to be picked very soon may represent higher value in the rapid fulfillment area than items that will not be picked for a relatively longer time (and therefore are taking up physical space in the rapid fulfillment area that could be used for other items). In this example, the expected value of having the item available in the rapid fulfillment area may generally increase with decreasing expected time until the item will be picked (in the absence of other contributing factors).

The cost metric may also be based on an estimated time difference between a picker picking the item from the rapid fulfillment area or picking the item from its standard shelf location. Here, the time difference may be derived from a store plan (e.g., in the form of a map and/or data table) associated with the retailer location that includes information about the storage location of each item and/or the relative distances and/or paths to the rapid fulfillment location. In some embodiments, the time difference may be estimated on a per order basis for actual or predicted future orders. In this case, the time difference may be derived from the locations of specific items in the actual or predicted order and their relative locations. For example, if an order includes multiple items on one side of a warehouse and a single item on the opposite side of the warehouse, the predictive picking module 250 may predict a significant time savings if the last item was instead available at the rapid fulfillment area. Generally, the expected value of having the item in the rapid fulfillment area may increase with increased time difference associated with picking the item from its standard storage location (in the absence of other contributing factors).

In further embodiment, a path modeling algorithm may be employed to predict the time difference associated with stocking an item in the rapid fulfillment area. Here, the path modeling algorithm may predict the paths through the retail environment associated with fulfilling an actual or predicted order and may determine the incremental time difference associated with picking an additional item based on the additional item's storage location relative to the predicted path. For example, if a predicted path of a picker is expected to pass directly by an item, the incremental time to pick the item from its standard storage location may be negligible. On the other hand, if the predicted path would be significantly longer to pick the additional item from its standard storage location relative to the rapid fulfillment location, the expected incremental time may be significant. In one or more embodiments, the path modeling algorithm may be based on historical tracking data from tracking pickers through the retail location during historical order fulfillments. The tracking data may be obtained, for example, from a location service of the picker client device 110, a smart shopping cart that tracks location, in-store sensors, camera, or other location tracking techniques.

In further embodiments, co-occurrence modeling may be employed to predict co-occurrences of items in an order. Using this type of modeling may generate cost metrics that are more highly correlated between items having high co-occurrences. For example, if peanut butter and jelly are frequently ordered together, a decision of whether or not to stock peanut butter or jelly in the rapid fulfillment area may be highly correlated (as opposed to being entirely independent).

The cost metric may furthermore be based in part on the physical size of the items. For example, because the rapid fulfillment area is of limited volume, it may be less valuable to stock very large items in this space (e.g., watermelons) relative to much smaller items (e.g., key limes). Generally, the expected value of having the item in the rapid fulfillment area may increase inversely with the volume of the item (in the absence of other contributing factors).

The cost metric may furthermore be based in part on what items are already present (or predicted to present) in the rapid fulfillment area. Here the optimization model may determine optimal quantities of each item to have in the rapid fulfillment area based on any of the factors above, or a combination thereof. For example, in one or more embodiments, the predictive picking module 250 may determine the cost metric as an incremental value of adding an additional item to the rapid fulfillment area given its current stock of that item. In other embodiments, the predictive picking module 250 may directly predict an optimal quantity of an item to stage at the rapid fulfillment area.

In one or more embodiments, the cost metric is based in part on one or more high level business metrics such as revenue, sales volume, additional customers, etc. Here a machine learning model may be trained to learn (based on historical and/or simulated data) which items, if selected for preemptive picking to the rapid fulfillment area, are expected to have the most positive impact of these business goals.

The predictive picking module 250 may rank each item based on their respective cost metrics to generate a ranked list of items (e.g., ordered from highest to lowest expected value of staging item in rapid fulfillment location). Based on the rank list, the top scoring items may be selected for staging in the rapid fulfillment area. Here, a cutoff may be determined based on a predefined scoring threshold. Alternatively, a cutoff may be determined when a total available volume in the rapid fulfillment area is reached.

The dynamic replenishment module 260 facilitates intelligent replenishment of items in the rapid fulfillment location. In one or more embodiments, store employees or dedicated replenishment pickers may be employed to move items from the standard storage locations to the rapid fulfillment area. Here, the picker client device 110 may provide instructions to pickers based on an output of the predictive picking module 250, tracked locations of the pickers, or other information to enable efficient replenishment of the rapid fulfillment area.

In another embodiment, the dynamic replenishment module 260 may intelligently task pickers fulfilling existing orders with replenishing items of the rapid fulfillment area. For example, a picker may facilitate an order that involves picking one item from the standard store shelves (e.g., whipping cream), and several items that are available in the rapid fulfillment area (e.g., eggs, orange juice, bread). The dynamic replenishment module 260 may determine that three cartons of 2% milk should be staged to the rapid fulfillment area and assign this replenishment task to the picker. This extra assignment has negligible or very small effect on the overall shopping time because the 2% milk is stored next to the whipping cream (where the picker is already going) and because the picker is already expected to visit the rapid fulfillment area (to pick the eggs and orange juice). Thus, the picker can replenish the 2% milk at little or no additional time/cost. Moreover, the assignment seems reasonable from the perspective of the picker because it represents a trade of items, where the picker replenishes one item (that is already convenient to grab) in exchange for the more efficient procurement of several other items (eggs, orange juice, bread) from the rapid fulfillment area without having to pick these from their standard storage locations.

In further embodiments, a hybrid system may be used where either dedicated staff or pickers fulfilling other orders may be assigned to replenishing one or more items in the rapid fulfillment area.

In one or more embodiments, the dynamic replenishment module 260 implements an optimization model on a per-order basis to determine replenishment assignments for a picker fulfilling an order of items. The replenishment assignment specifies one or more replenishment items that the picker should pick from its standard storage location and to deliver to the rapid fulfillment area, where it will be staged for future pickers. As described in the example above, these assignments may be made for items that are not necessarily part of the order the picker is fulfilling. However, assignments may generally be made in a way that optimizes some fulfillment criteria and can generally be performed by the picker without significant additional time expenditure (e.g., because the items are proximate to an expected path of the picker fulfilling the existing order). For example, in a relatively simple use case, if it is known or predicted that six gallons of milk will be picked for actual or predicted orders in an upcoming time window, it is much more efficient for the first picker that arrives to procure all six gallons and stage the extras in the rapid fulfillment area, rather than have all six pickers individually obtain the milk from its standard location. The picker that performs this replenishment may similarly benefit from being able to obtain other items in the order from the rapid fulfillment area that were put there by previous shoppers.

In an example implementation, the optimization model may obtain information about items in an order to be fulfilled by a picker, information about the warehouse layout and storage locations of items, information about a predicted path of the picker when fulfilling an order, information about the current stock in the rapid fulfillment area, information about which items are associated with high expected values if made available in the rapid fulfillment area (as determined by the predictive picking module 250), and/or other information. Based on this information, the optimization model may determine incremental costs associated with a picker replenishing an item to the rapid fulfillment area and optimize based on these incremental costs.

In one or more embodiments, the optimization model may facilitate a trade, in which a picker is only able to utilize picking of items from the rapid fulfillment area in exchange for the picker picking at least one replenishment item to replenish the rapid fulfillment area. For example, the dynamic replenishment module 260 may determine a cost metric (time spent) for a picker to pick a particular item from the rapid fulfillment area and a cost metric for picking new replenishment items from standard storage locations. The cost metric associated with picking the new replenishment may be based in part on the incremental time for the picker to procure the item (e.g., given the shopper's expected path) and the expected incremental value of having the item available in the rapid fulfillment area for future pickers. The picker may be assigned the replenishment task and directed to fulfill other items from the rapid replenishment area when the respective cost metrics result in a net benefit. Alternatively, the picker may be presented, via the picker client device 110, with the option to accept the replenishment task in exchange for enabling the picker to pick other items from the rapid fulfillment area. The picker client device 110 may furthermore show the predicted time saving associated with the option. If the picker chooses to accept the option, the picker client device 110 may facilitate instructions for picking items (including the replenishment items) in accordance with the selected option. Otherwise, if the option is declined, the picker client device 110 may facilitate picking items from their standard storage location.

In one or more embodiments, the optimization model may determine a likelihood of a picker accepting different possible replenishment assignments. The optimization model may determine assignments based in part on the likelihood of acceptance in combination with the value associated with the picker accepting the replenishment assignments.

In one or more embodiments, the relative costs associated with replenishing items may be determined on an item-by-item basis and ranked based on their relative expected benefit. The picker may then be assigned to a set of replenishment items that optimize the overall net benefit.

In further embodiments, the dynamic replenishment module 260 may facilitate a global optimization that does not necessarily enforce a trade on a per-order basis. In this implementation, one picker may be assigned to a replenishment task without necessarily receiving the benefit of being able to pick other items from the rapid fulfillment area, or a picker may be allowed to pick items from the rapid fulfillment area without necessarily being assigned any replenishment task. In this implementation, the optimization model may instead optimize over a set of actual or predicted orders over one or more time periods associated with different pickers with a goal of minimizing a total or average order fulfillment time or optimizing some other related metric (e.g., profitability). In some embodiments, a picker may be provided some different incentive for performing replenishment tasks, such as additional compensation.

In one or more embodiments, the dynamic replenishment module 260 may optimize replenishment decisions by performing simulations of picking tasks over a time period under varying assignment structures. The simulations may generate one or more output metrics (e.g., total picking time) that may be evaluated to determine, based on the simulation results, optimal assignments of the replenishment tasks to pickers.

As described above, the picker client device 110 may provide information to the picker to facilitate both fulfillment of order and replenishment tasks. For example, the picker client device 110 may present items in the order for picking, the locations for picking those items (either the standard storage location or the rapid fulfillment area), and items that the picker has been assigned to replenish to the rapid fulfillment area. The picker may interact with the picker client device 110 to track progress of picking and/or accept or decline replenishment requests.

In one or more embodiments, the dynamic replenishment module 260 may operate substantially independently of the predictive picking module 250. In this embodiment, the predictive picking module 250 may first select the items for staging in the rapid fulfillment location, and the dynamic replenishment module 260 then intelligently determines a replenishment plan for those items. In another embodiment, the dynamic replenishment module 260 and predictive picking module 250 may operate in a coordinated manner to jointly optimize the selection of items for staging and the replenishment plan. Here, for example, the cost metric associated with staging an item may be based in part on the efficiency of replenishing the item using existing pickers. For example, in the absence of other factors, an item may be ranked more highly by the dynamic replenishment module 260 if it is on a path (or predicted path) of a picker that can efficiently replenish the item relative to an item that is more out of the way for the picker.

Figure 3:
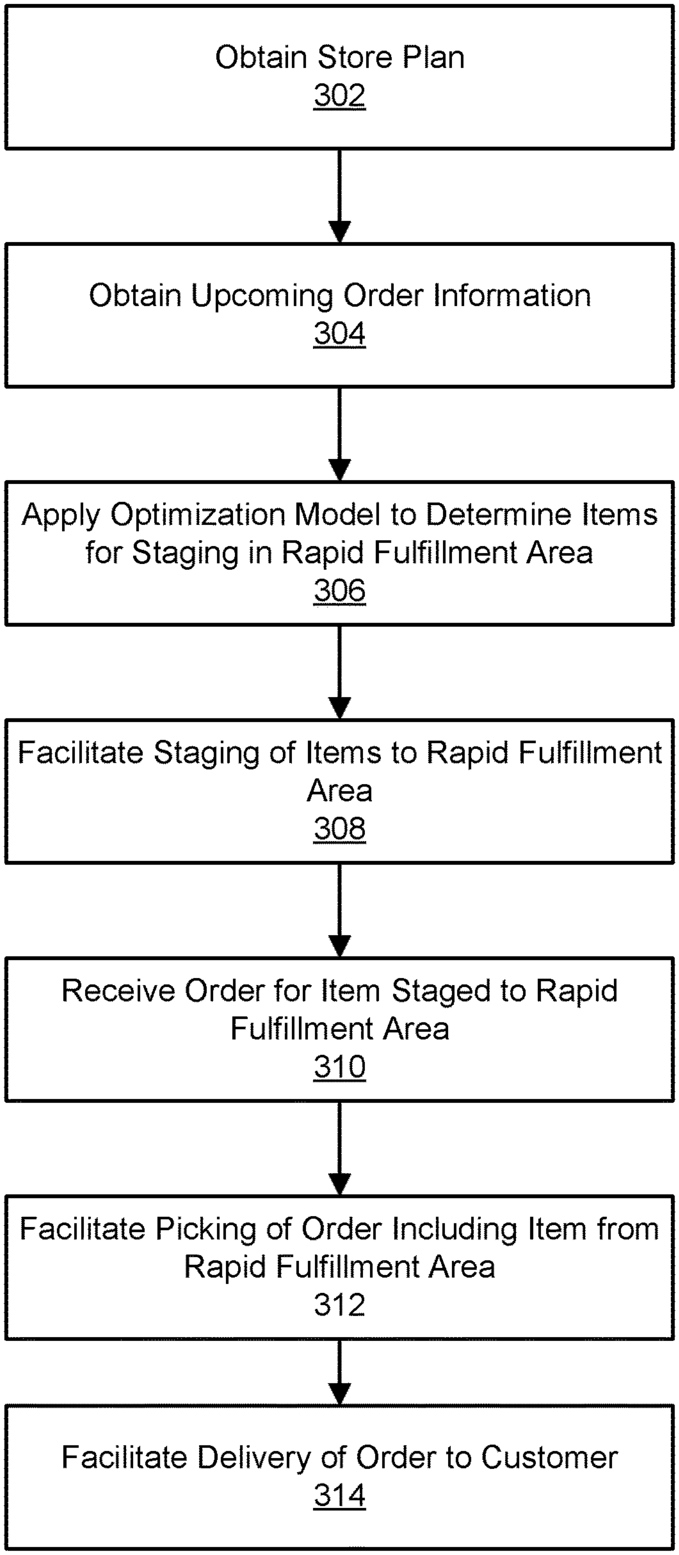
FIG. 3 is a flowchart illustrating a process for facilitating predictive picking of items for staging in a rapid fulfillment area of a physical retailer in association with an online concierge system, in accordance with one or more embodiments.

FIG. 3 is a flowchart illustrating a method for predictively picking items for staging in a rapid fulfillment area of a physical retailer in accordance with an optimization model. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 302 a store plan that describes a layout of a physical retailer. The store plan indicates standard storage locations of items and information about a rapid fulfillment area of the physical retailer available that is used to stage select items for rapid fulfillment. The online concierge system 140 also receives 304 order information associated with actual or predicted orders for items in an upcoming time window. Predicted orders may be inferred based on a machine learning model and/or time series model applied to historical data or simulations of the online concierge system 140.

The online concierge system applies 306 an optimization model that determines one or more items for staging in the rapid fulfillment area during the upcoming time window. The optimization model may optimize a cost metric based on the store plan and the one or more actual or predicted orders. The cost metric may represent various factors such as a time to procure an item from either the standard storage location or the rapid fulfillment area, the physical space occupied by items in the rapid fulfillment area, the likelihoods and/or confidence levels of items being ordered in the upcoming time window, an estimated time until items will be picked in association with an actual or predicted order, or other factors.

The online concierge system 140 facilitates 308 staging of selected items to the rapid fulfillment area. For example, the online concierge system 140 may select items from a ranked list based on their respective cost metrics. Staging of the items may be performed by dedicated staff or by pickers fulfilling other orders using the dynamic replenishment techniques described above (and in FIG. 4 below).

The online concierge system 140 receives 310 orders and facilitates 312 picking of items for an order, which may include picking at least one item from the rapid fulfillment area (and may also include picking other items from their standard storage locations). For example, the online concierge system 140 may present navigational guidance, based on the store plan, via the picker client device 110 to a picker assigned to fulfill the order.

The online concierge system 140 then facilitates 314 delivery of the items in an order to a customer. Delivery may be performed by the same or different picker than the picker assigned to pick the items.

Figure 4:
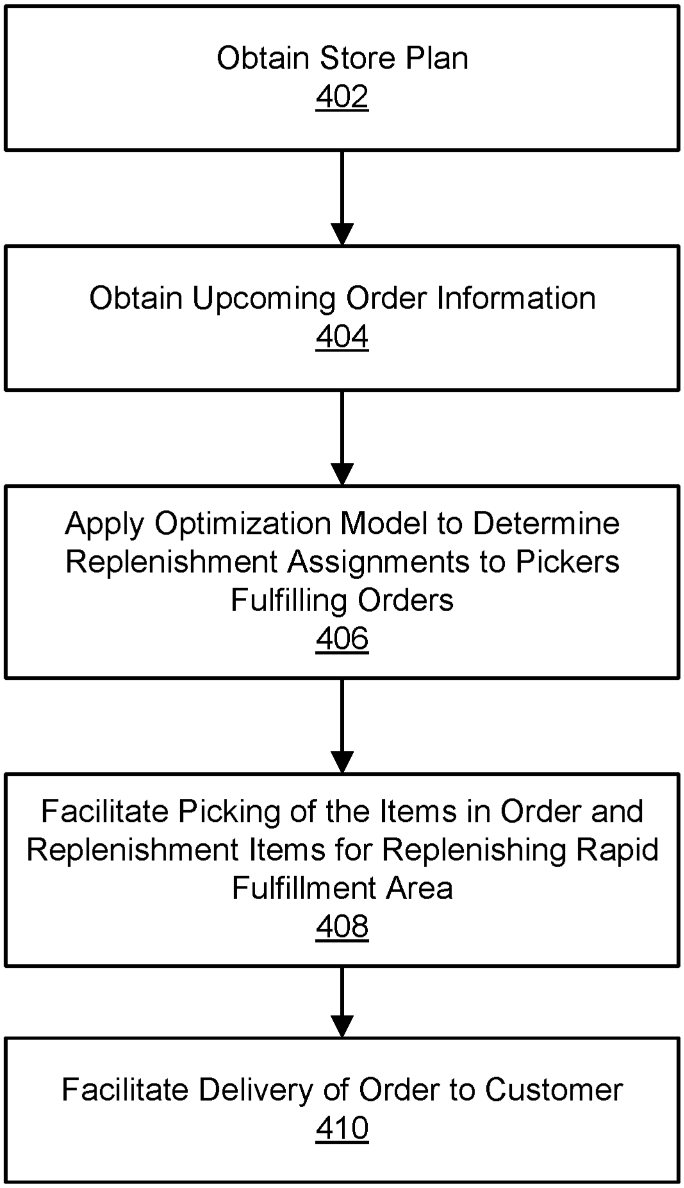
FIG. 4 is a flowchart illustrating a process for facilitating dynamic replenishment of items in a rapid fulfillment area of a physical retailer in association with an online concierge system, in accordance with one or more embodiments.

FIG. 4 is a flowchart illustrating a method for dynamically replenishing items for staging in a rapid fulfillment area of a physical retailer in accordance with an optimization model. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

The online concierge system 140 receives 402 a store plan that describes a layout of a physical retailer and receives 404 information about one or more upcoming orders, as described above. The online concierge system applies 406 an optimization model that determines one or more assignments for a picker to pick a replenishment item from its standard storage location for staging in the rapid fulfillment area in the course of fulfilling an existing order. The replenishment items are not necessarily items included in the existing order. The optimization model may determine cost metrics on a per item basis indicative of the relative cost of picking an item in the order from the rapid fulfillment area instead of its standard storage location, and/or relative cost of replenishing an item to the rapid fulfillment area.

The online concierge system 140 facilitates 408 picking of items for an order, which may include picking at least one item for the order from the rapid fulfillment area (and may also include picking other items from their standard storage locations), and may include performing at least one replenishment task to deliver an item from its standard storage location to the rapid fulfillment area. For example, the online concierge system 140 may present navigational guidance via the picker client device 110 to a picker assigned to fulfill the order.

The online concierge system 140 then facilitates 410 delivery of the items in an order to a customer. Delivery may be performed by the same or different picker than the picker assigned to pick the items.

Additional Considerations

The foregoing description of the embodiments has been presented for the purpose of illustration, and many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at an online concierge system comprising a processor and a computer-readable medium:
- obtaining, by the online concierge system, a store plan indicating standard storage locations of items in a physical retailer and information about a rapid fulfillment area of the physical retailer available to stage select items for rapid fulfillment;
- obtaining, by the online concierge system, upcoming order information associated with one or more actual or predicted orders for items in an upcoming time window;
- applying an optimization model to determine, based on the store plan and the one or more actual or predicted orders, one or more items for staging in the rapid fulfillment area during the upcoming time window, wherein applying the optimization model comprises:
  - determining, for each of a set of candidate items, respective cost metrics characterizing incremental costs associated with picking the candidate items from their respective standard storage locations instead of the rapid fulfillment area by:
    - predicting paths of pickers for fulfilling orders, and
    - determining respective time differences between picking the candidate items from their respective standard storage locations and picking the candidate items from the rapid fulfillment area based at least in part on the predicted paths;
- generating a first set of instructions for a first picker client device that cause the picker client device to facilitate picking of the items from the standard storage locations to the rapid fulfillment area;
- receiving information identifying an order from a customer that includes at least one item stocked to the rapid fulfillment area;
- generating a second set of instructions that direct a picker of a second picker client device to procure the order from the physical retailer, including procurement of the at least one item from the rapid fulfillment area;

causing the second picker client device to present an option to accept a replenishment task in exchange for enabling the picker to pick an additional item from the rapid fulfillment area;

in response to receiving an indication from the second picker client device that the picker accepted the replenishment task, re-generating the second set of instructions that direct the picker to procure the order from the physical retailer, including procurement of the at least one item and the additional item from the rapid fulfillment area; and generating instructions that facilitate delivery of the order to the customer.

2. The method of claim 1, wherein applying the optimization model comprises, for each set of candidate items:

generating a ranking of the set of candidate items based on the respective cost metrics; and selecting a subset of the candidate items for stocking in the rapid fulfillment area based on the ranking.

3. The method of claim 2, wherein determining the respective cost metrics comprises:

determining the respective cost metrics based at least in part on the respective time differences.

4. The method of claim 2, wherein determining the respective cost metrics comprises:

determining size information for each of the set of candidate items; and determining the respective cost metrics based at least in part on the size information relative to available space in the rapid fulfillment area.

5. The method of claim 1, wherein obtaining the upcoming order information comprises:

applying a predictive model to historical data indicative of historical orders in the online concierge system.

6. The method of claim 1, wherein obtaining the upcoming order information comprises:

determining respective likelihoods associated with the items being ordered within the upcoming time window.

7. The method of claim 1, wherein obtaining the upcoming order information comprises:

determining for each of the items, respective predicted amounts of time until the items will be picked.

8. A non-transitory computer-readable storage medium storing instructions that, when executed by an online concierge system comprising at least one processor, cause the online concierge system to perform steps including:

obtaining, by the online concierge system, a store plan indicating standard storage locations of items in a physical retailer and information about a rapid fulfillment area of the physical retailer available to stage select items for rapid fulfillment;

obtaining, by the online concierge system, upcoming order information associated with one or more actual or predicted orders for items in an upcoming time window;

applying an optimization model to determine, based on the store plan and the one or more actual or predicted orders, one or more items for staging in the rapid fulfillment area during the upcoming time window, wherein applying the optimization model comprises:

determining, for each of a set of candidate items, respective cost metrics characterizing incremental costs associated with picking the candidate items from their respective standard storage locations instead of the rapid fulfillment area by:

predicting paths of pickers for fulfilling orders, and determining respective time differences between picking the candidate items from their respective standard storage locations and picking the candidate items from the rapid fulfillment area based at least in part on the predicted paths;

generating a first set of instructions for a first picker client device that cause the picker client device to facilitate picking of the items from the standard storage locations to the rapid fulfillment area;

receiving information identifying an order from a customer that includes at least one item stocked to the rapid fulfillment area;

generating a second set of instructions that direct a picker of a second picker client device to procure the order from the physical retailer, including procurement of the at least one item from the rapid fulfillment area;

causing the second picker client device to present an option to accept a replenishment task in exchange for enabling the picker to pick an additional item from the rapid fulfillment area;

in response to receiving an indication from the second picker client device that the picker accepted the replenishment task, re-generating the second set of instructions that direct the picker to procure the order from the physical retailer, including procurement of the at least one item and the additional item from the rapid fulfillment area; and generating instructions that facilitate delivery of the order to the customer.

9. The non-transitory computer-readable storage medium of claim 8, wherein applying the optimization model comprises, for each set of candidate items:

generating a ranking of the set of candidate items based on the respective cost metrics; and selecting a subset of the candidate items for stocking in the rapid fulfillment area based on the ranking.

10. The non-transitory computer-readable storage medium of claim 9, wherein determining the respective cost metrics comprises:

determining the respective cost metrics based at least in part on the respective time differences.

11. The non-transitory computer-readable storage medium of claim 9, wherein determining the respective cost metrics comprises:

determining size information for each of the set of candidate items; and determining the respective cost metrics based at least in part on the size information relative to available space in the rapid fulfillment area.

12. The non-transitory computer-readable storage medium of claim 8, wherein obtaining the upcoming order information comprises:

applying a predictive model to historical data indicative of historical orders in the online concierge system.

13. The non-transitory computer-readable storage medium of claim 8, wherein obtaining the upcoming order information comprises:

determining respective likelihoods associated with the items being ordered within the upcoming time window.

14. The non-transitory computer-readable storage medium of claim 8, wherein obtaining the upcoming order information comprises:

determining for each of the items, respective predicted amounts of time until the items will be picked.

15. An online concierge system comprising:

one or more processors; and a non-transitory computer-readable storage medium storing instructions that, when executed by the one or more processors, cause the online concierge system to perform steps including:

obtaining, by the online concierge system, a store plan indicating standard storage locations of items in a physical retailer and information about a rapid fulfillment area of the physical retailer available to stage select items for rapid fulfillment;

obtaining, by the online concierge system, upcoming order information associated with one or more actual or predicted orders for items in an upcoming time window;

applying an optimization model to determine, based on the store plan and the one or more actual or predicted orders, one or more items for staging in the rapid fulfillment area during the upcoming time window, wherein applying the optimization model comprises:

determining, for each of a set of candidate items, respective cost metrics characterizing incremental costs associated with picking the candidate items from their respective standard storage locations instead of the rapid fulfillment area by:

predicting paths of pickers for fulfilling orders, and determining respective time differences between picking the candidate items from their respective standard storage locations and picking the candidate items from the rapid fulfillment area based at least in part on the predicted paths;

generating a first set of instructions for a first picker client device that cause the picker client device to facilitate picking of the items from the standard storage locations to the rapid fulfillment area;

receiving information identifying an order from a customer that includes at least one item stocked to the rapid fulfillment area;

generating a second set of instructions that direct a picker of a second picker client device to procure the order from the physical retailer, including procurement of the at least one item from the rapid fulfillment area;

causing the second picker client device to present an option to accept a replenishment task in exchange for enabling the picker to pick an additional item from the rapid fulfillment area;

in response to receiving an indication from the second picker client device that the picker accepted the replenishment task, re-generating the second set of instructions that direct the picker to procure the order from the physical retailer, including procurement of the at least one item and the additional item from the rapid fulfillment area; and generating instructions that facilitate delivery of the order to the customer.

16. The online concierge system of claim 15, wherein applying the optimization model comprises, for each set of candidate items:

generating a ranking of the set of candidate items based on the respective cost metrics; and selecting a subset of the candidate items for stocking in the rapid fulfillment area based on the ranking.

17. The online concierge system of claim 16, wherein determining the respective cost metrics comprises:

determining the respective cost metrics based at least in part on the respective time differences.

* * * * *